(12) United States Patent
Singh et al.

(10) Patent No.: US 8,219,966 B2
(45) Date of Patent: Jul. 10, 2012

(54) METHOD AND SYSTEM FOR INTEGRATING AN APPLICATION FLOORPLAN AND AN EXTERNAL SERVICE

(75) Inventors: Pradeep Kumar Singh, Azamgarh (IN); Ramesh B.G, Bangalore (IN); Jianguo Chen, Shanghai (CN); Anand Kothalkar, Bangalore (IN); Dinu Pavithran, Kodungallore (IN); Rama Krishna Prasad Vadlamudi, Hyderabad (IN)

(73) Assignee: SAP AG, Walldorf (DE)

( * ) Notice: Subject to any disclaimer, the term of this patent is extended or adjusted under 35 U.S.C. 154(b) by 1100 days.

(21) Appl. No.: 12/055,333

(22) Filed: Mar. 26, 2008

(65) Prior Publication Data
US 2009/0248741 A1 Oct. 1, 2009

(51) Int. Cl.
G06F 9/44 (2006.01)
G06F 9/45 (2006.01)

(52) U.S. Cl. .................. 717/100; 717/104; 717/108

(58) Field of Classification Search .......... 717/114–116, 717/100–108, 120–123
See application file for complete search history.

(56) References Cited

U.S. PATENT DOCUMENTS

| | | | | |
|---|---|---|---|---|
| 5,586,329 A * | 12/1996 | Knudsen et al. | | 717/108 |
| 6,083,276 A * | 7/2000 | Davidson et al. | | 717/107 |
| 6,505,343 B1 * | 1/2003 | Menon et al. | | 717/116 |
| 6,543,047 B1 * | 4/2003 | Vrhel et al. | | 717/121 |
| 6,725,446 B1 * | 4/2004 | Hahn et al. | | 717/103 |
| 6,772,408 B1 * | 8/2004 | Velonis et al. | | 717/100 |
| 6,789,252 B1 * | 9/2004 | Burke et al. | | 717/100 |
| 6,968,535 B2 * | 11/2005 | Stelting et al. | | 717/104 |
| 6,985,939 B2 * | 1/2006 | Fletcher et al. | | 709/223 |
| 7,234,132 B2 * | 6/2007 | Lam | | 717/120 |
| 7,320,120 B2 * | 1/2008 | Rajarajan et al. | | 717/104 |
| 7,325,007 B2 * | 1/2008 | Castro et al. | | 1/1 |
| 7,426,503 B2 * | 9/2008 | Baras et al. | | 706/52 |
| 7,634,501 B2 * | 12/2009 | Yabloko | | 1/1 |
| 7,703,073 B2 * | 4/2010 | Illowsky et al. | | 717/121 |
| 7,954,084 B2 * | 5/2011 | Arcaro et al. | | 717/108 |
| 7,971,180 B2 * | 6/2011 | Kreamer et al. | | 717/101 |
| 8,006,224 B2 * | 8/2011 | Bateman et al. | | 717/104 |
| 8,037,453 B1 * | 10/2011 | Zawadzki | | 717/123 |

OTHER PUBLICATIONS

Ma et al, "Configurable multi product floorplanning", IEEE, pp. 549-554, 2010.*
Murali et al, "Desigining application specific network chips with floorplan information", ACM ICCAD, pp. 355-362, 2006.*
Correa et al, "Semantic mapping and K means applied to hybrid SOM based document organization system construction", ACM SAC, pp. 1112-1116, 2008.*
Antoun et al, "Static extraction and conformance analysis of hierarchical runtime architectural structure using annotations", ACM OOPSLA, pp. 321-340, 2009.*
Masson et al, "CHEOPS: An integrated VLSI fllor planning and chip assembly system implemented in object oriented LISP", IEEE, pp. 250-256, 1990.*

* cited by examiner

*Primary Examiner* — Anil Khatri

(57) ABSTRACT

In one embodiment, data in an application floorplan is exposed in a controlled way for integrating new external services to the application floorplan. Service definitions of the external service for integration with the application floorplan is generated. Further, a semantic type data of a global data type used in the application floorplan is generated. Upon generating the semantic type data, a semantic type mapping of an instance of the semantic type data is generated. Furthermore a map between a service parameter of the external service and the semantic type mapping is presented. Thereby, the application floorplan and the external service are integrated by executing the external service in the application floorplan using the generated map.

20 Claims, 4 Drawing Sheets

METHOD AND SYSTEM FOR INTEGRATING AN APPLICATION FLOORPLAN AND AN EXTERNAL SERVICE

TECHNICAL FIELD

Embodiments of the invention generally relate to computer systems, and more particularly to a method and system for integrating an external service.

BACKGROUND

In current computing systems, several hurdles exist that make the integration of an external service such as a google map service to an internal system very difficult. There is typically a need to access a service using a floorplan of the internal system. In current systems, several floorplans present the data in a data object in different formats. As the data is not presented in a uniform way, it is very difficult for the external service to get meaningful information from a floorplan of the internal system. Furthermore the data available in the floorplans is typically implementation dependent, country specific and language specific. The external service generally requires data that is implementation independent and not country specific or language specific.

It is typically required to expose more data than what is available in the floorplan. In addition, the data in the floorplan must be exposed in a controlled way to keep future changes to the internal system in mind. Furthermore the data must be exposed in a way that a customer is able to extend the application for integrating new services to the internal system.

SUMMARY OF THE INVENTION

Embodiments of the invention are generally directed to a method and system for integrating an external service. A first definition of a service for integration with an application floorplan is generated. A semantic type data having a second definition of a global data type used in the application floorplan is generated. A semantic type mapping having a third definition of an instance of the semantic type data in a data object used in the application floorplan is generated. A map is generated between a service parameter of the service and the semantic type mapping. The service is executed in the application floorplan using the map.

These and other benefits and features of embodiments of the invention will be apparent upon consideration of the following detailed description of preferred embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with its advantages, may be best understood from the following detailed description taken in conjunction with the accompanying drawings. The invention is illustrated by way of example and not by way of limitation in the figures of the accompanying drawings. It should be noted that references to "an" or "one" embodiment in this disclosure are not necessarily to the same embodiment, and such references mean at least one.

DETAILED DESCRIPTION

Embodiments of the invention are generally directed to a method and system for integrating an external service. A first definition of a service for integration with an application floorplan is generated. A semantic type data having a second definition of a global data type used in the application floorplan is generated. A semantic type mapping having a third definition of an instance of the semantic type data in a data object used in the application floorplan is generated. A map is generated between a service parameter of the service and the semantic type mapping. The service is executed in the application floorplan using the map.

Figure 1:
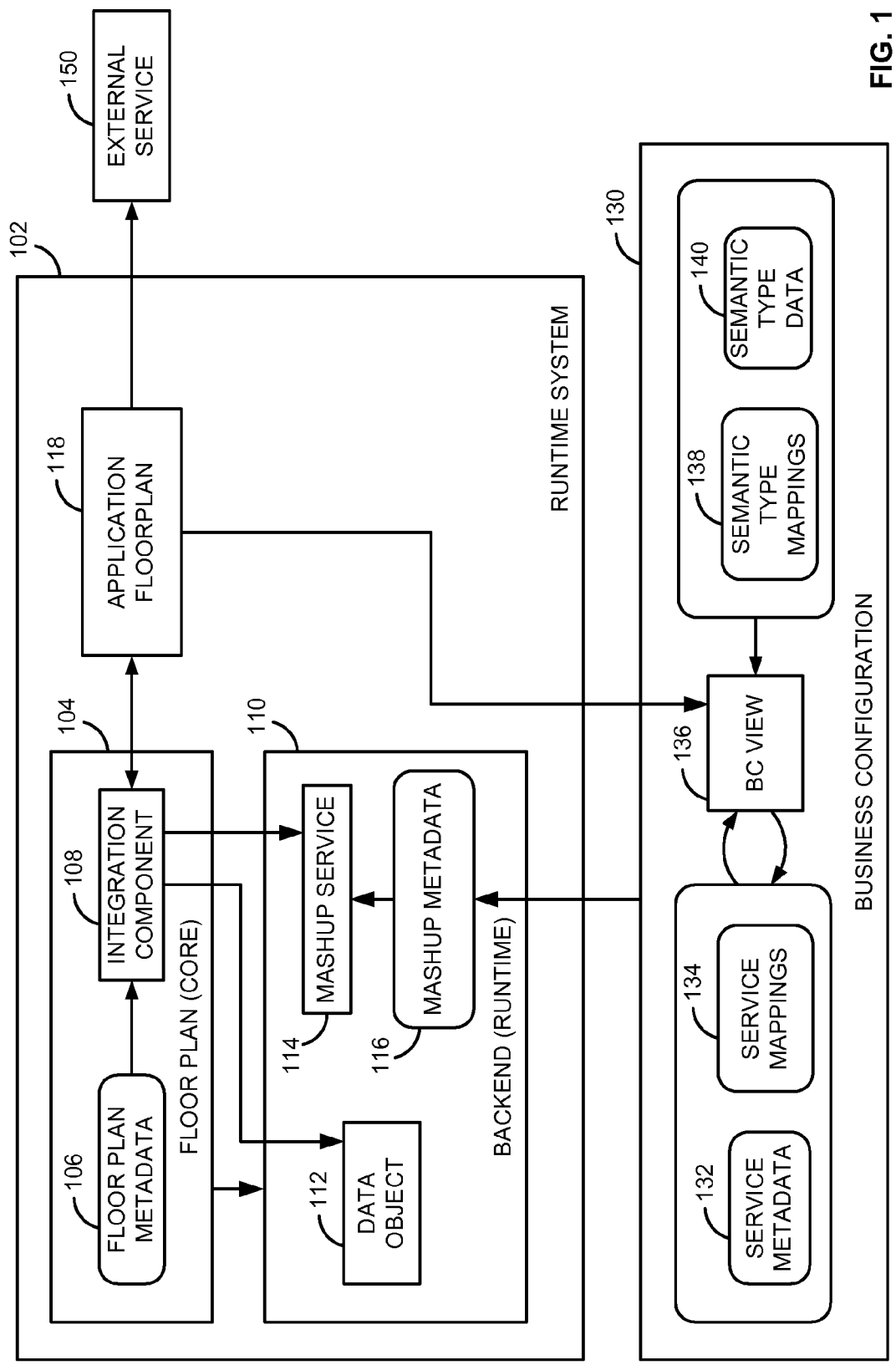
FIG. 1 is a functional block diagram of a system for integrating an external service according to an embodiment of the invention.

FIG. 1 is a functional block diagram of a system for integrating an external service according to an embodiment of the invention. Business configuration 130 typically stores service metadata 132, service mappings 134, semantic type mappings 138 and semantic type data 140. Runtime system 102 includes floor plan core 104, backend runtime 110 and application floorplan 118. Application floorplan 118 is typically a combination of user interface patterns arranged in a specific order in an application. Application floorplan 118 allows a user to accomplish a certain activity, such as searching for, identifying and maintaining data for data object 112. Service metadata 132 typically includes one or more service definitions for external service 150. The service definitions for external service 150 typically include a uniform resource locater, a binding information, one or more service parameters and a type of each service parameter. External service 150 is generally executed by passing one or more values to the service parameters of external service 150. External service 150 may be provided to the user as a feature by application floorplan 118. In order to provide external service 150 as a feature in application floorplan 118, application floorplan 118 must be able to pass values of the service parameters to external service 150.

Semantic type data 140 is generally a data that must be exposed to external service 150 for integration of external service 150 to application floorplan 118. Semantic type data 140 typically includes definitions of one or more global data types being used in application floorplan 118. The definitions of the global data types include path definitions to each of the global data types and path definitions to one or more elements in the global data types. In an embodiment, the elements are nodes of the global data types. A global data type is typically a structural representation of data used by software programs. Actual data values can be seen as instances of (one or more) data types. In particular, a global data type restricts the actual data values that can be represented as instances of the global data type in one or more data objects 112. Semantic type data 140 is typically declared by the user based on service metadata 132 of external service 150. In an embodiment, semantic type data 140 is typically declared by the user using business configuration (BC) view 136 and saved in business configuration 130. An example of semantic type data 140 is "address". "Address" may have several elements such as street, city, country, postal code and the like. Semantic type data 140 includes the path definitions for the global data type "address" and the path definitions for the elements of the global data type "address". In an embodiment, semantic type data 140 groups one or more of the elements. For example, semantic type data 140 may group the elements of "address". Thus irrespective of what part of the "address" is displayed in application floorplan 118, external service 150 has access to all the elements of the "address". In an embodiment, the type of a service parameter is typically defined as a semantic type data 140.

Semantic type mappings 138 typically include definitions of one or more instances of semantic type data 140 in a data object 112 used in application floorplan 118. The definitions of the instances of semantic type data 140 include a path definition to an element in the instance of semantic type data 140. Thus semantic type mappings 138 define the path definitions to the actual data stored in data objects that is passed to the service parameters in external service 150.

Service mappings 134 typically include maps between the service parameters of external service 150 and the corresponding semantic type mappings 138. The maps in service mappings 134 generally map a service parameter to a path leading to a value of an element of a semantic type instance stored in data object 112 that is passed to the service parameter in runtime system 102. In an embodiment, on invoking business configuration view 136 from application floorplan 118, a data object name of data object 112 and a floorplan name of application floorplan 118 are passed to business configuration 130. Based on the data object name and the floorplan name business configuration 130 reads semantic type mappings 138 and service metadata 134 and generates service mappings 134.

Service metadata 132, service mappings 134, semantic type data 140 and semantic type mappings 138 are deployed in backend runtime 110 as mashup metadata 116. Mashup service 114 is typically responsible to read mashup metadata 116 in backend runtime 110. Integration component 108 is responsible for communication between floorplan core 104 and application floorplan 118. As application floorplan is brought up a first time, integration component 108 reads mashup metadata 116 from backend runtime 110 and finds out the available external services 150 configured in business configuration 130. displays external service 150 as a user interface element. In an embodiment the user interface element may be a link, a toolbar item or a service option in a service panel. On selecting the user interface element by the user, integration component 108 typically reads service mappings 134 and semantic type mappings 138, and follows the path definition to one or more elements stored in business object 112. The values of the elements are then read by integration component 108. Integration component 108 packages the values of the elements with the corresponding service parameters and passes the values to external service 150 for execution of the service.

In an embodiment, semantic type mappings 138 are calculated by integration component 108 from floorplan metadata 106. Floorplan metadata 106 typically includes a definition of data object 112 and a path definition to the global data type used in application floorplan 118.

Figure 2:
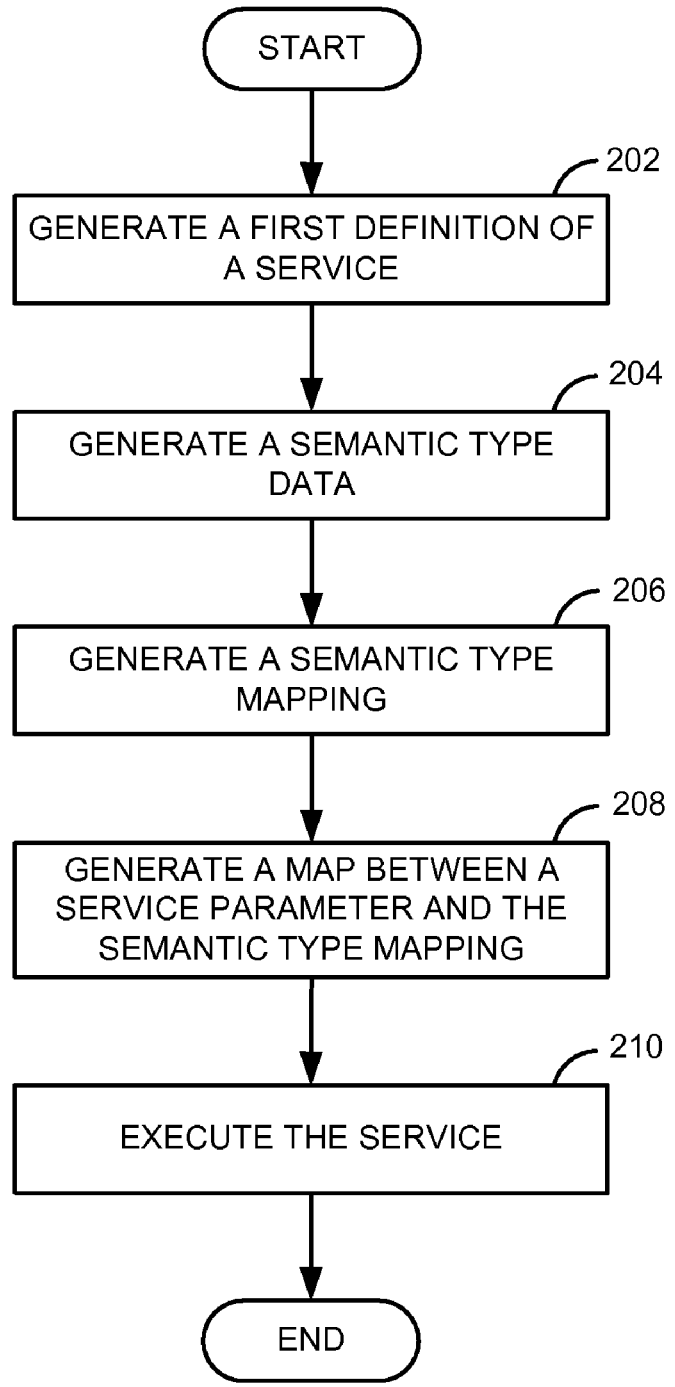
FIG. 2 is a flow diagram of a process for integrating an external service according to an embodiment of the invention.

FIG. 2 is a flow diagram of a process for integrating an external service according to an embodiment of the invention. In process block 202, a first definition of a service for integration with an application floorplan is generated. The application floorplan typically allows a user to accomplish a certain activity, such as searching for, identifying and maintaining data for a data object. The first definition typically includes one or more service definitions for the service. The service definitions for the service typically include a uniform resource locater, a binding information, one or more service parameters and a type of each service parameter. In process block 204, a semantic type data is generated. The semantic type data has a second definition of a global data type used in the application floorplan. The semantic type data is generally a data that must be exposed to the service for integration of the service to the application floorplan. The second definition typically includes definitions of one or more global data types being used in the application floorplan. In process block 206, a semantic type mapping is generated. The semantic type mapping has a third definition of an instance of the semantic type data in a data object used in the application floorplan. The third definition includes a path definition to an element in the instance of the semantic type data. Thus the semantic type mapping defines the path definitions to the actual data stored in the data object. In process block 208, a map is generated between a service parameter of the service and the semantic type mapping. The map is generally maps the service parameter to a path leading to a value of an element of the instance of the semantic type data stored in the data object that is passed to the service parameter. In process block 210, the service is executed in the application floorplan using the map. Executing the service typically includes reading the map and the semantic type mapping, and following the path definition to one or more elements stored in the business object. The values of the elements are then read. The values of the elements are packaged with the corresponding service parameter and passed the service for execution of the service.

Figure 3:
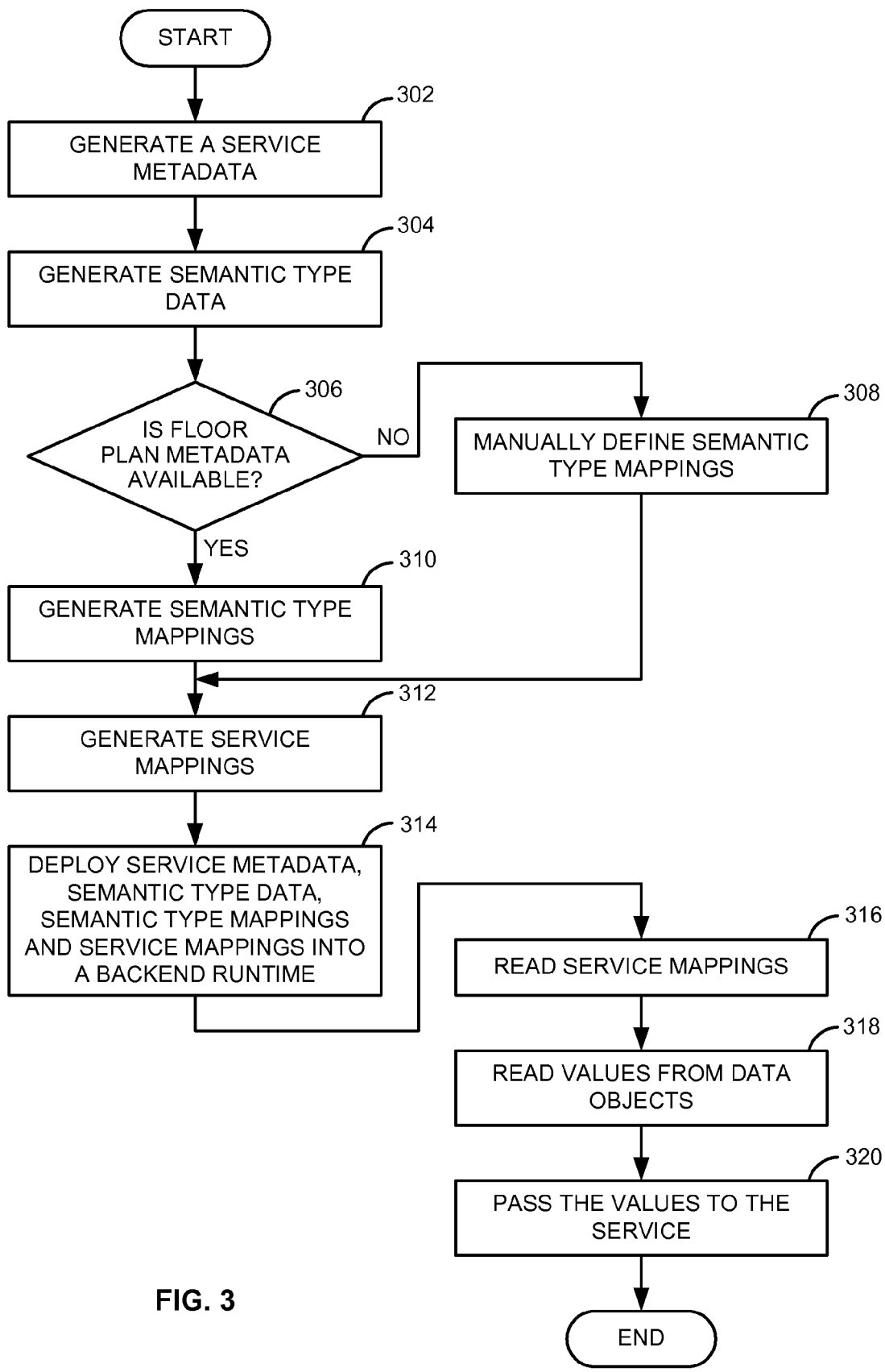
FIG. 3 is a flow diagram of a process for integrating an external service according to an embodiment of the invention.

FIG. 3 is a flow diagram of a process for integrating an external service according to an embodiment of the invention. In process block 302, a service metadata is generated. The service metadata typically includes one or more service definitions for an external service. The service definitions for the external service typically include a uniform resource locater, a binding information, one or more service parameters and a type of each service parameter. The external service is generally executed by passing one or more values to the service parameters of the external service. The external service may be provided to a user as a feature by an application floorplan. In order to provide the external service as a feature in the application floorplan, the application floorplan must be able to pass the values of the service parameters to the external service. In process block 304, a semantic type data is generated. The semantic type data is generally a data that must be exposed to the external service for integration of the external service to the application floorplan. The semantic type data typically includes definitions of one or more global data types being used in the application floorplan. The definitions of the global data types include path definitions to each global data type and path definitions to one or more elements in the global data types. The semantic type data is typically declared by the user based on the service metadata of the external service.

In decision block 306, if a floorplan metadata is not available for the application floorplan, the process moves to process block 308 where the user defines one or more semantic type mappings manually. The floorplan metadata typically includes a definition of a data object and a path definition to the global data type used in the application floorplan. The process moves from process block 308 to process block 312. In decision block 306, if the floorplan metadata is available for the application floorplan, the process moves to process block 310 where the semantic type mappings are generated from the floorplan metadata. The semantic type mappings typically include definitions of one or more instances of the semantic type data in the data object used in the application floorplan. The definitions of the instances of the semantic type data include a path definition to an element in the instance of the semantic type data. Thus the semantic type mappings define the path definitions to the actual data stored in the data objects that is passed to the service parameters in the external service.

In process block 312, one or more service mappings are generated. The service mappings typically include maps between the service parameters of the external service and the corresponding semantic type mappings. The maps in the service mappings generally map a service parameter to a path leading to a value of an element of an instance of the semantic type data stored in the data object, the values being passed to the service parameter.

In process block 314, the service metadata, the semantic type data, the semantic type mappings and the service mappings are deployed into a backend runtime. In process block 316, the service mappings are read. In process block 318, the values of one or more elements are read from the data object by following the path defined in the service mapping. In process block 320, the values of the elements are typically packaged with the corresponding service parameters and passed to the external service for execution of the external service.

Figure 4:
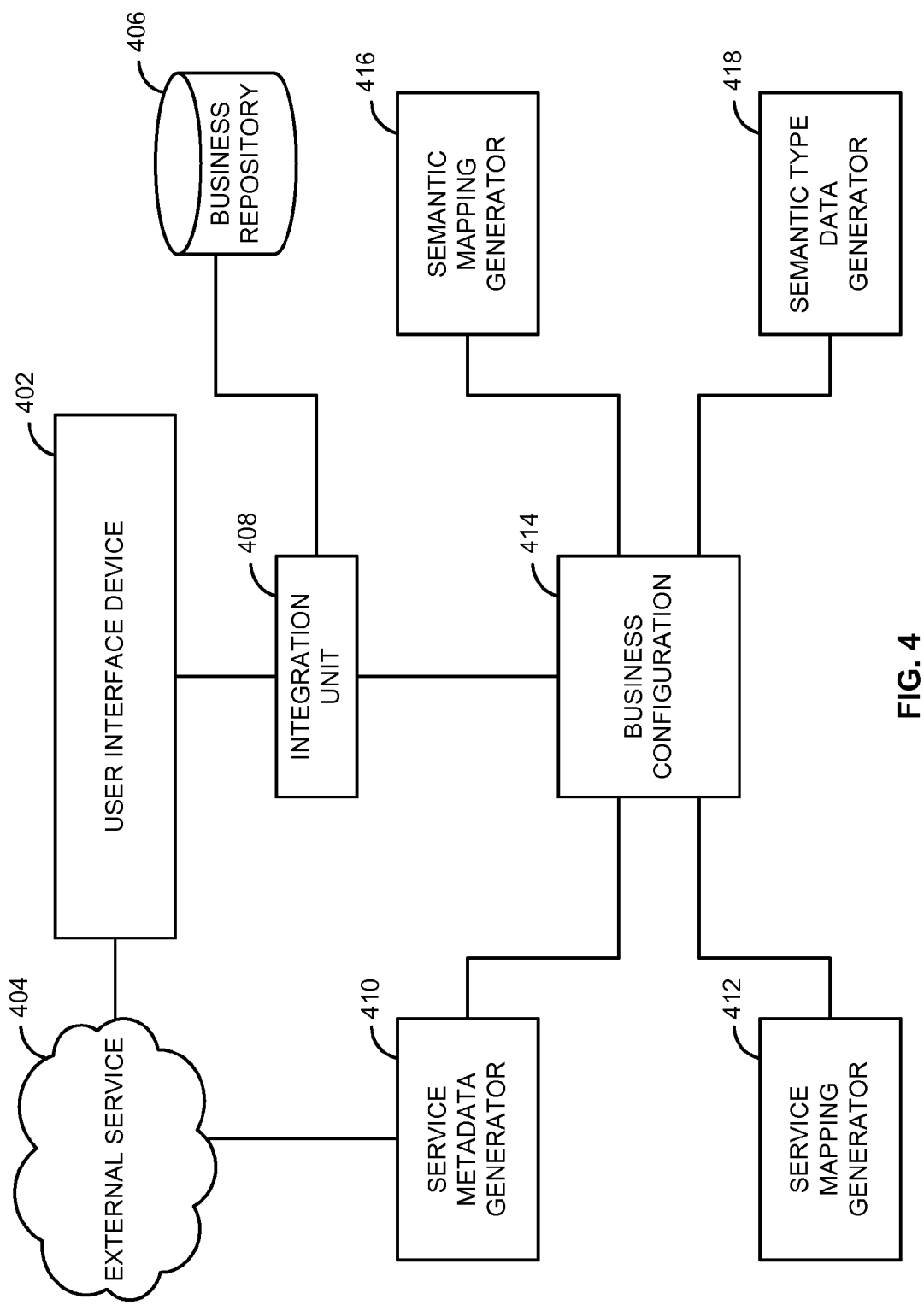
FIG. 4 is a block diagram of a system for integrating an external service useful for implementing the invention according to an embodiment of the invention.

FIG. 4 is a block diagram of a system for integrating an external service useful for implementing the invention according to an embodiment of the invention. Business configuration 414 typically stores a service metadata, one or more service mappings, one or more semantic type mappings and a semantic type data. User interface 402 enables a user to work on one or more application floorplans. The application floorplan is typically a combination of user interface patterns arranged in a specific order in an application. The application floorplan allows a user to accomplish a certain activity, such as searching for, identifying and maintaining data for one or more data objects stored in business repository 406.

Service metadata generator 410 is responsible for generating the service metadata. The service metadata typically includes one or more service definitions for external service 404. The service definitions for external service 404 typically include a uniform resource locater, a binding information, one or more service parameters and a type of each service parameter. External service 404 is generally executed by passing one or more values to the service parameters of external service 404. External service 404 may be provided to the user as a feature by the application floorplan. In order to provide external service 404 as a feature in the application floorplan, the application floorplan must be able to pass values of the service parameters to external service 404.

Semantic type data generator 418 is responsible for generating the semantic type data. The semantic type data is generally a data that must be exposed to external service 404 for integration of external service 404 to the application floorplan. The semantic type data typically includes definitions of one or more global data types being used in the application floorplan. The definitions of the global data types include path definitions to each global data type and path definitions to one or more elements in the global data types. In an embodiment, the semantic type data is declared by the user using user interface 402 based on the service metadata of external service 404.

Semantic mappings generator 416 is typically responsible for generating the semantic type mappings. The semantic type mappings typically include definitions of one or more instances of the semantic type data in a data object used in the application floorplan. The definitions of the instances of the semantic type data include a path definition to an element in the instance of the semantic type data. Thus the semantic type mappings define the path definitions to the actual data stored in the data objects that is passed to the service parameters in external service 404. In an embodiment, the semantic type mappings are manually declared by the user using user interface 402 and stored in business configuration 414.

Service mapping generator 412 is responsible for generating the service mappings using the service metadata and the semantic type mappings. The service mappings typically include maps between the service parameters of external service 404 and the corresponding semantic type mappings. The maps in the service mappings generally map a service parameter to a path leading to a value of an element of a semantic type instance stored in the data object that is passed to the service parameter. In an embodiment, the user may manually declare the service mappings using user interface 402.

Integration unit 408 is responsible for communication between the application floorplan and business configuration 414. As application floorplan is brought up a first time in user interface 402, integration unit 408 reads business configuration 414 and finds out external service 404 configured in business configuration 414. Integration unit 408 passes the available external service 404 to the application floorplan. The application floorplan typically displays external service 404 as a user interface element in the application floorplan. In an embodiment the user interface element may be a link, a toolbar item or a service option in a service panel. On selecting the user interface element by the user, integration unit 408 typically reads service mappings and semantic type mappings from business configuration 414, and follows the path definition to one or more elements stored in the business object. The values of the elements are then read by integration unit 408. Integration unit 408 packages the values of the elements with the corresponding service parameters and passes the values to external service 404 for execution of the service.

In an embodiment, the semantic type mappings are calculated by integration component 408 from a floorplan metadata. The floorplan metadata typically includes a definition of the data object and a path definition to the global data type used in the application floorplan.

The particular methods associated with embodiments of the invention are described in terms of computer software and hardware with reference to flowcharts. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

Embodiments of the invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. The invention may be downloaded as a computer program which may be transferred from a remote computer (e.g., a server) to a requesting computer (e.g., a client) by way of a communication link (e.g., a modem or network connection).

What is claimed is:

1. A computer implemented method to integrate an application floorplan and an external service in a computer, the method comprising:
   the computer generating a first definition including one or more service definitions of the external service for integration with the application floorplan;
   the computer generating a second definition including semantic type data of a global data type used in the application floorplan;
   the computer generating a third definition including semantic type mapping of an instance of the semantic type data of the second definition in a data object used in the application floorplan based on metadata of the application floorplan;
   the computer presenting a map between a service parameter in the first definition of the external service and the semantic type mapping of the third definition by processing the service parameter and the semantic type mapping;
   storing at least one of the one or more service definitions, the semantic type data, the semantic type mapping, and the map between the service parameter and the semantic type mapping; and
   the computer integrating the application floorplan and the external service by executing the external service in the application floorplan using the map.

2. The computer implemented method of claim 1, wherein the metadata of the application floorplan comprises a definition of the data object, a definition of an instance of the data object used in the application floorplan and a path definition to the global data type used in the application floorplan.

3. The computer implemented method of claim 1, wherein the one or more service definitions of the external service comprises a uniform resource locator, a binding information, the service parameter and a type of the service parameter.

4. The computer implemented method of claim 1, wherein the semantic type data of the second definition of the global data type comprises a first path definition to the global data type and a second path definition to an element in the global data type.

5. The computer implemented method of claim 1, wherein the third definition of the instance of the semantic type data comprises a path definition to an element in the instance of the semantic type data of the second definition.

6. The computer implemented method of claim 1, wherein executing the external service further comprising:
   reading a value of the service parameter from the data object using the map; and
   passing the value to the service parameter.

7. The computer implemented method of claim 1, wherein the one or more service definitions, the semantic type data, the semantic type mapping, and the map between the service parameter and the semantic type mapping are stored in a business configuration.

8. The computer implemented method of claim 1, wherein generating the map comprises generating the map in a business configuration view.

9. The computer implemented method of claim 1 further comprising deploying the first definition of the external service, the semantic type data, the semantic type mapping and the map between the service parameter and the semantic type mapping in a backend runtime system.

10. A computer system to integrate an application floorplan and an external service, the computer system comprising a processor, the processor communicating with one or more memory devices storing instructions related to:
    generating a first definition, in a service metadata generator, including one or more service definitions of the external service for integration with the application floorplan;
    generating a second definition including semantic type data of a global data type used in the application floorplan, in a semantic type data generator;
    generating a third definition including a semantic type mapping of an instance of the semantic type data of the second definition in a data object used in the application floorplan based on metadata of the application floorplan, in a semantic mapping generator;
    presenting a map between a service parameter in the first definition of the external service and the semantic type mapping of the third definition by processing the service parameter and the semantic type mapping in a service mapping generator;
    storing at least one of the one or more service definitions, the semantic type data, the semantic type mapping and the map between the service parameter and the semantic type mapping; and
    integrating the application floorplan and the external service, in an integrating unit, by executing the external service in the application floorplan using the map.

11. The computer system of claim 10 further comprising a business repository for storing the data object.

12. A machine-accessible medium that provides instructions that, when executed by a machine, cause the machine to:
    generate a first definition including one or more service definitions of an external service for integration with an application floorplan;
    generate a second definition including semantic type data of a global data type used in the application floorplan;
    generate a third definition including semantic type mapping of an instance of the semantic type data of the second definition in a data object used in the application floorplan based on metadata of the application floorplan;
    present a map between a service parameter in the first definition of the external service and the semantic type mapping of the third definition by processing the service parameter and the semantic type mapping;
    store at least one of the one or more service definitions, the semantic type data, the semantic type mapping, and the map between the service parameter and the semantic type mapping; and
    integrate the application floorplan and the external service by executing the external service in the application floorplan using the map.

13. The machine-accessible medium of claim 12, wherein the metadata of the application floorplan comprises a definition of the data object, a definition of an instance of the data object used in the application floorplan, and a path definition to the global data type used in the application floorplan.

14. The machine-accessible medium of claim 12, wherein the one or more service definitions of the external service comprises a uniform resource locator, a binding information, the service parameter and a type of the service parameter.

15. The machine-accessible medium of claim 12, wherein the semantic type data of the second definition of the global data type comprises a first path definition to the global data type and a second path definition to an element in the global data type.

16. The machine-accessible medium of claim 12, wherein the third definition of the instance of the semantic type data comprises a path definition to an element in the instance of the semantic type data of the second definition.

17. The machine-accessible medium of claim 12, wherein executing the external service further comprising:
   reading a value of the service parameter from the data object using the map; and
   passing the value to the service parameter.

18. The machine-accessible medium of claim 12, wherein the one or more service definitions, the semantic type data, the semantic type mapping and the map between the service parameter and the semantic type mapping are stored in a business configuration.

19. The machine-accessible medium of claim 12 further provides instructions that, when executed by a machine, cause the machine to:
   read the one or more service definitions from a business configuration, the one or more service definitions having the first definition of an external service for integration with the application floorplan;
   deploy the external service as a user interface element in the application floorplan;
   read the map between the external service and the semantic type mapping from the business configuration;
   read the semantic type mapping from the business configuration, the semantic type mapping having a path definition to an element in an instance of the semantic type data;
   read a value of the service parameter of the external service from the element; and
   pass the value of the service parameter to the external service.

20. The machine-accessible medium of claim 19 further providing instructions which when executed by the machine cause the machine to execute the external service based on the value of the service parameter for integrating the external service with the application floorplan.

* * * * *